(12) United States Patent
Gao

(10) Patent No.: US 10,596,957 B2
(45) Date of Patent: Mar. 24, 2020

(54) IMAGE RECOGNITION-BASED INTELLIGENT ALARM LAMP

(71) Applicant: Ningbo Kaishuo Lighting Technology Co., Ltd., Yuyao, Zhejiang Province (CN)

(72) Inventor: Yanhua Gao, Yuyao (CN)

(73) Assignee: NINGBO KAISHUO LIGHTING TECHNOLOGY CO., LTD., Yuyao, Zhejiang Province (CN)

(*) Notice: Subject to any disclaimer, the term of this patent is extended or adjusted under 35 U.S.C. 154(b) by 0 days.

(21) Appl. No.: 16/336,316

(22) PCT Filed: Jun. 30, 2017

(86) PCT No.: PCT/CN2017/091149
§ 371 (c)(1),
(2) Date: Mar. 25, 2019

(87) PCT Pub. No.: WO2018/223456
PCT Pub. Date: Dec. 13, 2018

(65) Prior Publication Data
US 2019/0217774 A1   Jul. 18, 2019

(30) Foreign Application Priority Data
Jun. 6, 2017   (CN) .......................... 2017 1 0418669

(51) Int. Cl.
*B60Q 1/52* (2006.01)
*G06K 9/00* (2006.01)
(Continued)

(52) U.S. Cl.
CPC ................ *B60Q 1/52* (2013.01); *B60Q 1/02* (2013.01); *B60Q 1/2611* (2013.01);
(Continued)

(58) Field of Classification Search
CPC .......... B60Q 1/52; B60Q 1/02; B60Q 1/2611; B60Q 1/2661; B60Q 2900/30; B60Q 7/00;
(Continued)

(56) References Cited

U.S. PATENT DOCUMENTS 4,020,047 A * 4/1977 Burland ............... B60Q 1/2611
362/235
8,963,705 B2 * 2/2015 Miller .................. B60Q 1/2611
340/471

(Continued)

FOREIGN PATENT DOCUMENTS

CN   101435541 A   5/2009
CN   201484259 U   5/2010
(Continued)

OTHER PUBLICATIONS

International Search Report issued in International Application No. PCT/CN2017/091149/, dated Feb. 24, 2018.
(Continued)

*Primary Examiner* — Eric Blount
(74) *Attorney, Agent, or Firm* — Charles C. Achkar; Ostrolenk Faber LLP.

(57) ABSTRACT

An image recognition-based intelligent alarm lamp includes a lighting device, a rotating mechanism, a high-definition camera, a DC motor, an LED alarm lamp and an embedded processing device. The lighting device is mounted onto the rotating mechanism and rotated with the rotating mechanism to illuminate an object from different directions; the DC motor is coupled to the rotating mechanism for driving the rotation of the rotating mechanism; the high-definition camera is provided for capturing a video stream around a police car; the embedded processing device is provided for receiving an image around the police car, determining whether or not to send a rotation drive signal to the DC motor based on (Continued)

the image around the police car, and determining a flashing method of the LED alarm lamp based on the image around the police car. This invention improves the level of recognizing a criminal around the police car.

7 Claims, 1 Drawing Sheet

(51) Int. Cl.

| | |
|---|---|
| *G06T 7/11* | (2017.01) |
| *G06T 7/194* | (2017.01) |
| *B60Q 1/26* | (2006.01) |
| *B60Q 1/02* | (2006.01) |
| *G06T 7/254* | (2017.01) |
| *H04N 7/18* | (2006.01) |

(52) U.S. Cl.
CPC ......... *B60Q 1/2661* (2013.01); *B60Q 1/2696* (2013.01); *G06K 9/00255* (2013.01); *G06K 9/00288* (2013.01); *G06K 9/00362* (2013.01); *G06K 9/00791* (2013.01); *G06T 7/11* (2017.01); *G06T 7/194* (2017.01); *G06T 7/254* (2017.01); *H04N 7/188* (2013.01); *G06T 2207/10016* (2013.01); *G06T 2207/30201* (2013.01); *G06T 2207/30252* (2013.01)

(58) Field of Classification Search
CPC ..... G06T 7/194; G06T 7/254; G06K 9/00255; G06K 9/00288; G06K 9/00362

USPC ......................................................... 340/471
See application file for complete search history.

(56) References Cited

U.S. PATENT DOCUMENTS

| | | | |
|---|---|---|---|
| 10,322,668 B2* | 6/2019 | Gao | B60Q 1/52 |
| 2012/0201041 A1* | 8/2012 | Gergets | B60Q 1/2611 362/493 |
| 2014/0369060 A1* | 12/2014 | Zhang | F21V 9/08 362/542 |
| 2015/0035437 A1* | 2/2015 | Panopoulos | F21V 14/02 315/112 |

FOREIGN PATENT DOCUMENTS

| | | |
|---|---|---|
| CN | 102692787 A | 9/2012 |
| CN | 103297747 A | 9/2013 |
| CN | 104637237 A | 5/2015 |
| JP | 2016109824 A | 6/2016 |

OTHER PUBLICATIONS

Written Opinion of the International Searching Authority issued in International Application No. PCT/CN2017/091149/, dated Feb. 24, 2018.

* cited by examiner

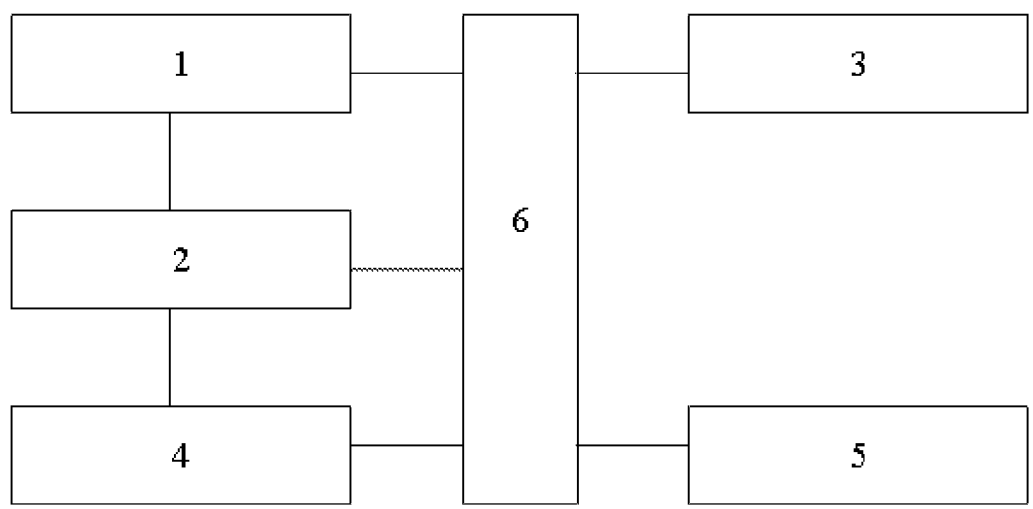

IMAGE RECOGNITION-BASED INTELLIGENT ALARM LAMP

CROSS REFERENCE TO RELATED APPLICATIONS

The present application is a § 371 National Phase application based on PCT/CN2017/091149 filed Jun. 30, 2017, which claims the benefit of Chinese application No. 201710418669.6 filed Jun. 6, 2017 the subject matter of each of which is incorporated by reference in their entirety.

FIELD OF THE INVENTION

The present invention relates to the field of LED alarm lamps, and more particularly to an image recognition-based intelligent alarm lamp.

BACKGROUND OF THE INVENTION

In general, alarm lamps adopt red and blue colors mainly for the following reasons:
1. Red is a primary color in the warm color system which has a warning effect, and blue is a primary color in the cold color system which is a sharp contrast to the red color and capable of attracting people's attention.
2. These colors have the features of strong light penetration at night.
3. The red color is eye-catching. For color blind people, the red and blue colors can be distinguished, because red is eye-catching.
4. As to feeling, psychologists have done a tolerability test. Two water pipes of which hot water and cold water are passing through respectively are used for the test, and these two pipes are tangled to form a knot. When touching the large connected pipe, we discovered that we can tolerate the feeling of the cold water pipe or the feeling of the hot water pipe alone, but the feeling of the tangled pipe has brought a lot of excitement to the senses. From a psychological point of view, this problem may be explained. A very large prompting effect can be achieved by a comparison of the two sensory elements.

In the prior art, present existing hardware resources of a traditional alarm lamp are not fully utilized, and thus leading to a single function of the alarm lamp. For example, the traditional alarm lamp is unable to identify a nearby criminal or spot an identified criminal, so as to facilitate a policeman to arrest the criminal.

SUMMARY OF THE INVENTION

Therefore, it is a primary objective of the present invention to overcome the aforementioned drawbacks of the prior art by providing an image recognition-based intelligent alarm lamp capable of matching a human face characteristic in a scene image with a criminal's face characteristic; outputting a criminal detection signal if there is a match; determining a pitch angle and an azimuth of a lighting device based on a relative position of a human sub-image in a scene image, and turning on the lighting device when the criminal detection signal is received, wherein a rotation drive signal including a pitch driving signal and an azimuth driving angle is sent to the DC motor to control the rotation of the lighting device.

To achieve the aforementioned and other objectives, the present invention provides an image recognition-based intelligent alarm lamp comprising a lighting device, a rotating mechanism, a high-definition camera, a DC motor, an LED alarm lamp, and an embedded processing device, characterized in that the lighting device is mounted onto the rotating mechanism and rotated together with the rotating mechanism in order to illuminate an object from different directions, and the DC motor is coupled to the rotating mechanism and provided for driving the rotation of the rotating mechanism, and the high-definition camera is provided for capturing a video stream around a police car, and the embedded processing device is coupled to the lighting device, the rotating mechanism, the high-definition camera, the DC motor and the LED alarm lamp and provided for receiving an image around the police car, determining whether or not to send a rotation drive signal to the DC motor based on the image around the police car, and also determining a flashing method of the LED alarm lamp based on the image around the police car.

Specifically, the image recognition-based intelligent alarm lamp further comprises an environmental parameter collecting device installed at the top of the police car or near the high-definition camera for collecting the ambient light brightness near the high-definition camera and outputting the brightness as the current brightness.

In the image recognition-based intelligent alarm lamp, the embedded processing device is coupled to the environmental parameter collecting device and the lighting device for receiving the current brightness, and regulating the beam intensity emitted from the lighting device based on the current brightness.

Wherein, the process of regulating the beam intensity emitted from the lighting device based on the current brightness includes "the brighter the current brightness, the stronger the beam intensity emitted from the lighting device".

Specifically, the image recognition-based intelligent alarm lamp further comprises: the embedded processing device sending a rotation drive signal including a pitch driving signal and an azimuth driving angle to the DC motor, wherein, the pitch driving signal includes a pitch angle, and the azimuth driving angle includes an azimuth;

an initial modeling device, coupled to the high-definition camera, for performing a median filter with a 5 pixel×5 pixel filter template to a first frame image of a video stream around the police car to obtain a median filter image, and using the median filter image as an output of an initialized background image;

a background update device, whenever a new frame image of the video stream around the police car is received, performing the following processes to each pixel in the new frame image acting as a target pixel: matching a pixel value of the target pixel with a pixel value of the pixel at a relative position in the background image, using the target pixel as a background point if there is a match, or using the target pixel as a non-background point if there is no match; calculating the statistics of the probability of a pixel point at a relative position of the target pixel determined to be a background point in all previous images in a video stream around the police car; updating the pixel value at a relative position of the target pixel in the background image determined as a background point if the probability is greater than or equal to a predetermined probability threshold; and outputting the updated background image after the background update device has carried out the aforementioned processes of the last pixel of the new frame image;

a foreground division device, coupled to the background update device, for subtracting the updated background image of the new frame image of the background update device based on video stream around the police car from the new frame image of the video stream around the police car to obtain an output of the foreground image;

a binarization device, coupled to the foreground division device, for receiving the foreground image to carry out a binarization of the foreground image to obtain a binary image;

a human body detection device, coupled to the binarization device, for receiving the binary image, for recognizing a target in the binary image based on a preset human body movement track to determine a human target in the binary image and output a human sub-image corresponding to the human target and divided from the binary image;

a face recognition device, coupled to the human body detection device, for recognizing a face characteristic in the human sub-image, and matching the face characteristic in the human sub-image with a criminal's face characteristic, and outputting a criminal detection signal if there is a match, and determining the pitch angle and the azimuth at a relative position of the binary image based on the human sub-image, or else, outputting a criminal-free signal; and the embedded processing device, coupled to the face recognition device, for turning on the lighting device when the criminal detection signal is received, and sending a rotation drive signal including a pitch driving signal and an azimuth driving angle to the DC motor.

Wherein, the embedded processing device increases the flashing frequency of the LED alarm lamp after the criminal detection signal is received.

Specifically, the image recognition-based intelligent alarm lamp further comprises a time division duplex communication interface coupled to the embedded processing device for downloading the most updated criminal's face characteristic from a remote police monitoring center server when the criminal detection signal is received, and forwarding the most updated criminal's face characteristic to the face recognition device through the embedded processing device.

In the image recognition-based intelligent alarm lamp, the embedded processing device is also provided for turning off the lighting device and decreasing the flashing frequency of the LED alarm lamp when the criminal-free signal is received.

In the image recognition-based intelligent alarm lamp, the LED alarm lamp comprises a red LED lighting assembly, a middle partition and a blue LED lighting assembly.

Wherein, the middle partition is disposed between the red LED lighting element and the blue LED lighting element.

In the image recognition-based intelligent alarm lamp, the lighting device, the LED alarm lamp, the rotating mechanism and the high-definition camera are installed at the top of the police car.

In the image recognition-based intelligent alarm lamp, the DC motor and the embedded processing device are installed in a frontend dashboard of the police car.

BRIEF DESCRIPTION OF THE DRAWING

FIG. 1 is a structural block diagram of an image recognition-based intelligent alarm lamp in accordance with an embodiment of the present invention.

DESCRIPTION OF THE PREFERRED EMBODIMENTS

The technical contents of the present invention will become apparent with the detailed description of preferred embodiments accompanied with the illustration of related drawings as follows. It is intended that the embodiments and FIGURES disclosed herein are to be considered illustrative rather than restrictive.

In addition, the police car must turn on the siren in the process of handling an emergency case, not only clearing the way for the police car to get to the crime scene in the first time only, but also playing an important role to scarce the suspect. In other words, the siren can scare away the suspect. In general, there is no warning in the emergency, policemen only have emergency plans for such an incidence, and it is impossible to have specific action deployments. In other words, the policemen simply rush to the location of emergency for rescue and try to minimize the damage caused by the incident instead of blindly chasing or arresting the suspect.

For example, a police command center suddenly received a call saying that someone was robbing with a knife, but a patrolling police car could not quietly lurk to the suspect in order to arrest him, since the suspect will not wait for the police car to come close to him before he succeeds in robbing and runs away, or he may hold someone as a hostage or hurt the hostage. It is definitely not worthwhile to pay for such big price. The siren and alarm lamp may be able to scare away the suspect due to his guilty conscience and may be able to stop the criminal act to protect the victim's life and property.

However, the function of the present existing alarm lamps of the police car is fixed and unable to identify nearby criminals or spot a light on the identified criminals. Therefore, the present invention discloses an image recognition-based intelligent alarm lamp to extend the function of the alarm lamp of the police car and overcome the aforementioned deficiencies of the prior art.

With reference to FIG. 1 for a structural block diagram of an image recognition-based intelligent alarm lamp in accordance with an embodiment of the present invention, the lamp comprises a lighting device, a rotating mechanism, a high-definition camera, a DC motor, an LED alarm lamp and an embedded processing device, characterized in that the lighting device is mounted onto the rotating mechanism and rotated with the rotating mechanism in a direction of rotation; the DC motor is coupled to the rotating mechanism for driving the rotation of the rotating mechanism; the high-definition camera is provided for capturing a video stream around a police car; the embedded processing device is coupled to the lighting device, the rotating mechanism, the high-definition camera, the DC motor and the LED alarm lamp for receiving an image around the police car, determining whether or not to send a rotation drive signal to the DC motor based on the image around the police car, and determining a flashing method of the LED alarm lamp based on the image around the police car.

The specific structure of the image recognition-based intelligent alarm lamp of the present invention will be described in details below.

The image recognition-based intelligent alarm lamp further comprises an environmental parameter collecting device installed at the top of the police car or a position near the high-definition camera for collecting an ambient light brightness near the high-definition camera and outputting the ambient light brightness as a current brightness.

In the image recognition-based intelligent alarm lamp, the embedded processing device is coupled to the environmental parameter collecting device and the lighting device for receiving the current brightness, and regulating the beam intensity emitted from the lighting device based on the current brightness Wherein, the process of regulating the beam intensity emitted from the lighting device according to the current brightness includes the brighter the current brightness, the stronger the beam intensity emitted from the lighting device.

The image recognition-based intelligent alarm lamp further comprises: the embedded processing device sending a rotation drive signal including a pitch driving signal and an azimuth driving angle to the DC motor, wherein the pitch driving signal includes a pitch angle, and the azimuth driving angle includes an azimuth;

an initial modeling device, coupled to the high-definition camera, for performing a median filter with a 5 pixel×5 pixel filter template to a first frame image of a video stream around the police car to obtain a median filter image, and using the median filter image as an output of an initialized background image;

a background update device, whenever a new frame image of the video stream around the police car is received, performing the following processes to each pixel in the new frame image acting as a target pixel: matching a pixel value of the target pixel with a pixel value of the pixel at a relative position in the background image, using the target pixel as a background point if there is a match, or using the target pixel as a non-background point if there is no match; calculating the statistics of the probability of a pixel point at a relative position of the target pixel determined to be a background point in all previous images in a video stream around the police car; updating the pixel value at a relative position of the target pixel in the background image determined as a background point if the probability is greater than or equal to a predetermined probability threshold; and outputting the updated background image after the background update device has carried out the aforementioned processes of the last pixel of the new frame image;

a foreground division device, coupled to the background update device, for subtracting the updated background image of the new frame image of the background update device based on video stream around the police car from the new frame image of the video stream around the police car to obtain an output of the foreground image;

a binarization device, coupled to the foreground division device, for receiving the foreground image to carry out a binarization of the foreground image to obtain a binary image;

a human body detection device, coupled to the binarization device, for receiving the binary image, for recognizing a target in the binary image based on a preset human body movement track to determine a human target in the binary image and output a human sub-image corresponding to the human target and divided from the binary image;

a face recognition device, coupled to the human body detection device, for recognizing a face characteristic in the human sub-image, and matching the face characteristic in the human sub-image with a criminal's face characteristic, and outputting a criminal detection signal if there is a match, and determining the pitch angle and the azimuth at a relative position of the binary image based on the human sub-image, or else, outputting a criminal-free signal;

the embedded processing device, coupled to the face recognition device, for turning on the lighting device when the criminal detection signal is received, and sending a rotation drive signal including a pitch driving signal and an azimuth driving angle to the DC motor;

Wherein, the embedded processing device increases the flashing frequency of the LED alarm lamp after the criminal detection signal is received.

The image recognition-based intelligent alarm lamp further comprises a time division duplex communication interface, coupled to the embedded processing device, for downloading the most updated criminal's face characteristic from a remote police monitoring center server when the criminal detection signal is received, and forwarding the most updated criminal's face characteristic to the face recognition device through the embedded processing device.

In the image recognition-based intelligent alarm lamp, the embedded processing device is also provided for turning off the lighting device and decreasing the flashing frequency of the LED alarm lamp when the criminal-free signal is received.

In the image recognition-based intelligent alarm lamp, the LED alarm lamp comprises a red LED lighting assembly, a middle partition and a blue LED lighting assembly.

Wherein, the middle partition is disposed between the red LED lighting element and the blue LED lighting element.

In the image recognition-based intelligent alarm lamp, the lighting device, the LED alarm lamp, the rotating mechanism and the high-definition camera are installed at the top of the police car.

In the image recognition-based intelligent alarm lamp, the DC motor and the embedded processing device are installed in a frontend dashboard of the police car.

Wherein, the high-definition camera is a complementary metal oxide semiconductor (CMOS) sensor which is a typical solid imaging sensor with the same historical origin of a charge coupled device (CCD). The CMOS image sensor is generally formed by a plurality of parts including a pixel sensitive unit array, a column driver, a row driver, a timing control logic, an AD converter, a data bus output interface, a control interface, etc. and these parts are generally integrated on a silicon wafer, and its working process can be divided into recovery, photoelectric conversion, integration, and reading.

The CMOS image sensor chip may be further integrated with other digital signal processing (DSP) circuits including AD converter, automatic exposure control, non-uniform compensation, white balance processing, black level control, Gamma correction, etc. To expedite the computation, DSP devices and CMOS device with a programmable design function may be integrated to form a single-chip digital camera and an image processing system.

In 1963, Morrison announced a computable sensor capable of measuring a light spot position by using the photoconductive effect, and such computable sensor became the beginning of the development of CMOS image sensors. In 1995, a single-chip digital camera with a low-noise CMOS active pixel sensor was very successful.

The image recognition-based intelligent alarm lamp of the present invention aims at the technical issue of the fixed function of the conventional alarm lamp and bases on the hardware of the conventional alarm lamp to integrate a plurality of image processing devices and directional lighting devices to achieve the effect of detecting and positioning a nearby criminal and using the directional lighting devices to spot a nearby criminal in a tracking manner.

While the present invention has been described by means of specific embodiments, numerous modifications and variations could be made thereto by those skilled in the art without departing from the scope and spirit of the present invention set forth in the claims.

What is claimed is:

1. An image recognition-based intelligent alarm lamp, comprising a lighting device, a rotating mechanism, a high-definition camera, a DC motor, an LED alarm lamp and an embedded processing device, characterized in that the lighting device is mounted onto the rotating mechanism and rotated with the rotating mechanism in a direction of rotation; the DC motor is coupled to the rotating mechanism for driving the rotation of the rotating mechanism; the high-definition camera is provided for capturing a video stream around a police car; the embedded processing device is coupled to the lighting device, the rotating mechanism, the high-definition camera, the DC motor and the LED alarm lamp for receiving an image around the police car, determining whether or not to send a rotation drive signal to the DC motor based on the image around the police car, and determining a flashing method of the LED alarm lamp based on the image around the police car;

and the image recognition-based intelligent alarm lamp further comprising:

an environmental parameter collecting device, installed at the top of the police car or a position near the high-definition camera for collecting an ambient light brightness near the high-definition camera and outputting the ambient light brightness as a current brightness;

wherein the embedded processing device is coupled to the environmental parameter collecting device and the lighting device for receiving the current brightness, and regulating the beam intensity emitted from the lighting device based on the current brightness; and the process of regulating the beam intensity emitted from the lighting device based on the current brightness includes the brighter the current brightness, the stronger the beam intensity emitted from the lighting device;

the image recognition-based intelligent alarm lamp, further comprising the embedded processing device sending a rotation drive signal including a pitch driving signal and an azimuth driving angle to the DC motor, wherein the pitch driving signal includes a pitch angle, and the azimuth driving angle includes an azimuth; an initial modeling device, coupled to the high-definition camera, for performing a median filter with a 5 pixel×5 pixel filter template to a first frame image of a video stream around the police car to obtain a median filter image, and using the median filter image as an output of an initialized background image; a background update device, whenever a new frame image of the video stream around the police car is received, performing the following processes to each pixel in the new frame image acting as a target pixel: matching a pixel value of the target pixel with a pixel value of the pixel at a relative position in the background image, using the target pixel as a background point if there is a match, or using the target pixel as a non-background point if there is no match; calculating the statistics of the probability of a pixel point at a relative position of the target pixel determined to be a background point in all previous images in a video stream around the police car; updating the pixel value at a relative position of the target pixel in the background image determined as a background point if the probability is greater than or equal to a predetermined probability threshold; and outputting the updated background image after the background update device has carried out the aforementioned processes of the last pixel of the new frame image; a foreground division device, coupled to the background update device, for subtracting the updated background image of the new frame image of the background update device based on video stream around the police car from the new frame image of the video stream around the police car to obtain an output of the foreground image; a binarization device, coupled to the foreground division device, for receiving the foreground image to carry out a binarization of the foreground image to obtain a binary image; a human body detection device, coupled to the binarization device, for receiving the binary image, for recognizing a target in the binary image based on a preset human body movement track to determine a human target in the binary image and output a human sub-image corresponding to the human target and divided from the binary image; a face recognition device, coupled to the human body detection device, for recognizing a face characteristic in the human sub-image, and matching the face characteristic in the human sub-image with a criminal's face characteristic, and outputting a criminal detection signal if there is a match, and determining the pitch angle and the azimuth at a relative position of the binary image based on the human sub-image, or else, outputting a criminal-free signal; the embedded processing device, coupled to the face recognition device, for turning on the lighting device when the criminal detection signal is received, and sending a rotation drive signal including a pitch driving signal and an azimuth driving angle to the DC motor; wherein, the embedded processing device increases the flashing frequency of the LED alarm lamp after the criminal detection signal is received.

2. The image recognition-based intelligent alarm lamp according to claim 1, further comprising:

a time division duplex communication interface, coupled to the embedded processing device, for downloading the most updated criminal's face characteristic from a remote police monitoring center server when the criminal detection signal is received, and forwarding the most updated criminal's face characteristic to the face recognition device through the embedded processing device.

3. The image recognition-based intelligent alarm lamp according to claim 2, wherein the embedded processing device is also provided for turning off the lighting device and decreasing the flashing frequency of the LED alarm lamp when the criminal-free signal is received.

4. The image recognition-based intelligent alarm lamp according to claim 3, wherein the LED alarm lamp comprises a red LED lighting assembly, a middle partition and a blue LED lighting assembly, and the middle partition is disposed between the red LED lighting element and the blue LED lighting element.

5. The image recognition-based intelligent alarm lamp according to claim 4, wherein the lighting device, the LED alarm lamp, the rotating mechanism and the high-definition camera are installed at the top of the police car.

6. The image recognition-based intelligent alarm lamp according to claim 1, wherein the DC motor and the embedded processing device are installed in a frontend dashboard of the police car.

7. The image recognition-based intelligent alarm lamp according to claim 2, wherein the DC motor and the embedded processing device are installed in a frontend dashboard of the police car.

* * * * *